(No Model.)

M. B. WILLIAMS.
HARROW TOOTH HOLDER.

No. 404,024. Patented May 28, 1889.

Witnesses:
Walter S. Hood
B. N. Burke

Inventor.
Malcolm B. Williams.
By Lucius C. West
Att'y

UNITED STATES PATENT OFFICE.

MALCOLM B. WILLIAMS, OF KALAMAZOO, MICHIGAN.

HARROW-TOOTH HOLDER.

SPECIFICATION forming part of Letters Patent No. 404,024, dated May 28, 1889.

Application filed February 11, 1889. Serial No. 299,443. (No model.)

*To all whom it may concern:*

Be it known that I, MALCOLM B. WILLIAMS, a citizen of the United States, residing at Kalamazoo, county of Kalamazoo, State of Michigan, have invented a new and useful Harrow-Tooth Holder, of which the following is a specification.

This invention relates to that class of harrows in which curved spring-teeth are employed having straight shanks clamped to the frame.

The object of the invention consists in the novel construction, below described and claimed, for attaching the tooth to the frame in a manner to adjust a tooth having a straight shank longitudinally.

Figure 1:
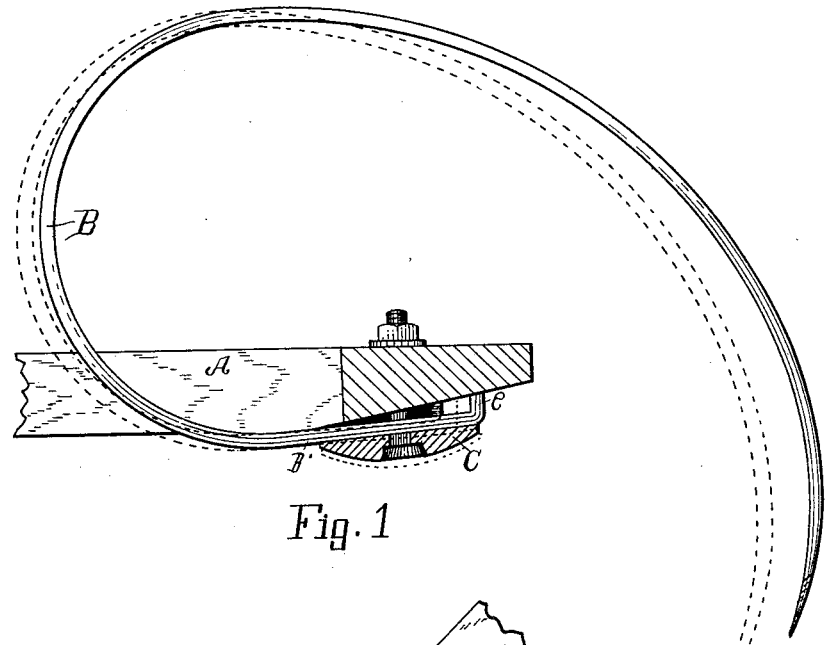
Figure 2:
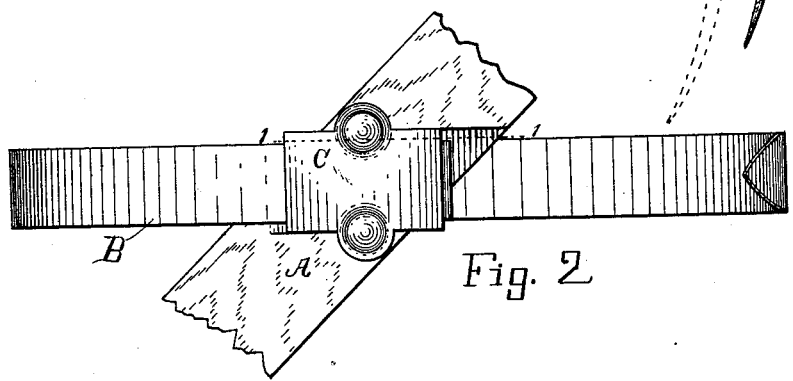
Figure 4:
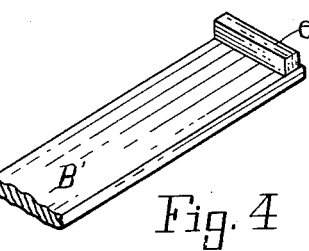
Figure 3:
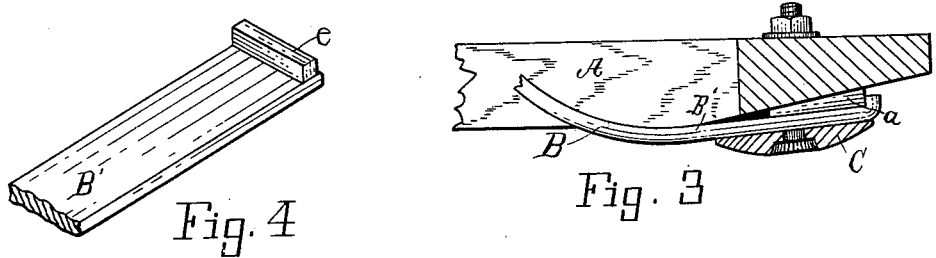

In the drawings forming a part of this specification, Figure 1 is a side elevation, with the harrow-beam and binding-clip in section, on line 1 1 in Fig. 2; Fig. 2, an inverted plan of Fig. 1; Fig. 3, same as parts in Fig. 1, showing a change; and Fig. 4 shows the shank of the tooth in perspective.

Referring to the lettered parts of the drawings, A is the beam of a harrow-frame, having an inclined recess formed in the under side obliquely across the beam, as in Figs. 1 and 2, to receive the straight shank of the tooth—that is, the recess starts at the surface of the beam on the under side near the front and grows deeper toward the rear. The end of the shank B' of the tooth B has a projection, e, formed by turning up the end of the shank, as at e, Fig. 1, or in any other way—as, for instance, by attaching a rib or projection on the shank B', as at e in Fig. 4. This projection rests on or against the inclined surface of the recess at the rear end of the shank B' and the front part of the shank fits against the beam at the front end of the recess, as clearly shown in Fig. 1. These bearing-points, in connection with the binding-clip C, which fits against the under side of the straight shank of the tooth and is held by bolts passed up through the beam A, successfully hold the tooth from slipping in its seat. By loosening the clip C and moving the tooth forward the projection e against the incline of the seat causes the tooth to tilt to the position, for instance, as shown by the dotted lines in Fig. 1, thus causing the point of the tooth to cut deeper into the soil. On the other hand, moving the tooth back raises the point of the tooth, causing it to run not so deep.

It may be desirable in some instances to have a greater bearing-surface for the shank of the tooth by making the projection of greater lineal dimensions and wedge-shaped, as at $a$ in Fig. 3, and this part $a$ may be attached to the shank of the tooth, or be separate and be placed between the incline of the recess and the shank of the tooth, and the end of the shank of the tooth may be turned up, as in Fig. 3, to keep the block $a$ in place when said block is not attached to the shank of the tooth; but this will not always be necessary.

The integral projection on the shank of the tooth and the wedge-block are both bearing-points for the shank of the tooth to rest upon.

Having thus described my invention, what I claim as new, and desire to secure by Letters Patent of the United States, is—

1. The combination of a harrow-beam having an inclined recess, a curved harrow-tooth having a straight shank, a bearing-point for the shank to rest upon between said shank and the inclined recess, and a clip-plate binding said shank to the beam, substantially as set forth.

2. The combination of a harrow-beam having the inclined recess, a curved harrow-tooth having a straight shank, and an inclined or wedge-shaped block between the shank of the tooth and the incline of the recess, substantially as set forth.

In testimony of the foregoing I have hereunto subscribed my name in presence of two witnesses.

MALCOLM B. WILLIAMS.

Witnesses:
SAMUEL FOLZ,
JOSEPH E. WILSON.